United States Patent
Whitney et al.

(10) Patent No.: US 9,811,356 B2
(45) Date of Patent: Nov. 7, 2017

(54) AUTOMATED SOFTWARE CONFIGURATION MANAGEMENT

(71) Applicant: AppDynamics LLC, San Francisco, CA (US)

(72) Inventors: Jonathan Whitney, Albany, CA (US); Ido Carmel, San Francisco, CA (US); Steffen Yount, San Francisco, CA (US)

(73) Assignee: AppDynamics LLC, San Francisco, CA (US)

( * ) Notice: Subject to any disclaimer, the term of this patent is extended or adjusted under 35 U.S.C. 154(b) by 0 days.

(21) Appl. No.: 14/611,024

(22) Filed: Jan. 30, 2015

(65) Prior Publication Data

US 2016/0224329 A1 Aug. 4, 2016

(51) Int. Cl.
*G06F 9/44* (2006.01)
*G06F 9/445* (2006.01)

(52) U.S. Cl.
CPC ............ *G06F 9/44505* (2013.01); *G06F 8/60* (2013.01); *G06F 8/71* (2013.01); *G06F 9/44521* (2013.01)

(58) Field of Classification Search
CPC .................................................. G06F 8/60–8/71
USPC .......................................... 717/121, 168–178
See application file for complete search history.

(56) References Cited

U.S. PATENT DOCUMENTS

| | | | |
|---|---|---|---|
| 5,958,010 A | 9/1999 | Agarwal | |
| 6,026,237 A | 2/2000 | Berry et al. | |
| 6,336,148 B1 | 1/2002 | Doong et al. | |
| 6,336,213 B1 | 1/2002 | Beadle et al. | |
| 6,470,494 B1 | 10/2002 | Chan | |
| 6,477,666 B1 | 11/2002 | Sanchez et al. | |
| 6,662,359 B1 | 12/2003 | Berry et al. | |
| 6,721,941 B1 | 4/2004 | Morshed | |
| 6,944,797 B1 | 9/2005 | Guthrie | |
| 7,054,361 B1 | 5/2006 | Otte et al. | |
| 7,096,421 B2 * | 8/2006 | Lou .................... | G06F 17/2211 707/999.001 |
| 7,328,213 B2 | 2/2008 | Suzuki | |
| 7,353,225 B2 * | 4/2008 | Dada ................ | G06F 17/30911 |
| 7,367,025 B1 | 4/2008 | Nikolov et al. | |
| 7,587,487 B1 | 9/2009 | Gunturu | |
| 7,603,440 B1 * | 10/2009 | Grabowski ....... | G06F 17/30067 709/220 |

(Continued)

OTHER PUBLICATIONS

Key Concepts: Using Merkle trees to detect inconsistencies in data—Bharatendra Boddu—Jul. 2, 2013; Blog: http://distributed-datastore.blogspot.com/2013/07/cassandra-using-merkle-trees-to-detect.html.*

(Continued)

*Primary Examiner* — Francisco Aponte
(74) *Attorney, Agent, or Firm* — Parker Ibrahim & Berg LLC; James M. Behmke; Stephen D. LeBarron (57) ABSTRACT

A system uses agents to monitor a distributed business transaction as well as monitor changes in software configuration. An agent may detect a file load, such a class load, obtain portions of the file such as functions, and perform a hash on the byte code functions. A hash tree may then be constructed and compared to previous states of the system. The hash tree may be generated, for example, at each file loading detected, so that system states can be compared. Differences in hash trees are detected and the changes are reported to an administrator of the system that provides the distrusted business transaction.

13 Claims, 5 Drawing Sheets

(56) References Cited

U.S. PATENT DOCUMENTS

| | | | |
|---|---|---|---|
| 7,739,675 B2 | 6/2010 | Klein | |
| 7,788,644 B2* | 8/2010 | Koduru | G06F 11/3447 714/38.14 |
| 7,926,049 B1* | 4/2011 | Kumar | G06F 9/44505 717/170 |
| 7,957,934 B2 | 6/2011 | Greifeneder | |
| 8,151,277 B2 | 4/2012 | Greifeneder et al. | |
| 8,224,935 B1* | 7/2012 | Bandopadhyay | G06F 9/5072 370/256 |
| 8,248,958 B1 | 8/2012 | Tulasi et al. | |
| 8,434,093 B2* | 4/2013 | Larimore | G06F 9/455 719/312 |
| 8,522,201 B2* | 8/2013 | Elmieh | G06F 8/71 707/690 |
| 8,676,901 B1 | 3/2014 | Nicolaou | |
| 8,719,386 B2* | 5/2014 | Lyman | H04L 41/024 709/220 |
| 8,752,015 B2* | 6/2014 | Basak | G06F 9/44505 717/120 |
| 8,776,038 B2* | 7/2014 | Larimore | G06F 17/30233 717/109 |
| 8,832,455 B1* | 9/2014 | Drewry | G06F 21/575 713/187 |
| 8,863,093 B1 | 10/2014 | Chou et al. | |
| 8,914,626 B1 | 12/2014 | Adogla et al. | |
| 9,075,978 B2* | 7/2015 | Schneider | G06F 21/572 |
| 9,195,451 B2* | 11/2015 | Lu | G06F 8/65 |
| 9,275,006 B2* | 3/2016 | Ludwig | G06F 15/177 |
| 9,311,071 B2* | 4/2016 | Tan | G06F 8/65 |
| 9,356,965 B2* | 5/2016 | Kjeldaas | H04L 63/20 |
| 2002/0018481 A1 | 2/2002 | Mor et al. | |
| 2002/0174174 A1 | 11/2002 | Ramraj | |
| 2003/0014549 A1 | 1/2003 | Seidman | |
| 2004/0025027 A1* | 2/2004 | Balard | G06F 21/31 713/183 |
| 2004/0030766 A1* | 2/2004 | Witkowski | H04L 41/082 709/223 |
| 2004/0031020 A1 | 2/2004 | Berry et al. | |
| 2004/0039728 A1 | 2/2004 | Fenlon | |
| 2005/0033767 A1 | 2/2005 | Kamentz | |
| 2005/0091376 A1 | 4/2005 | Helfman | |
| 2005/0155024 A1 | 7/2005 | Wannamaker | |
| 2005/0243837 A1 | 11/2005 | Boyd et al. | |
| 2005/0264581 A1 | 12/2005 | Patrick et al. | |
| 2005/0281259 A1 | 12/2005 | Mitchell | |
| 2006/0059092 A1 | 3/2006 | Burshan et al. | |
| 2006/0072568 A1 | 4/2006 | Vaananen | |
| 2006/0155803 A1 | 7/2006 | Muramatsu | |
| 2006/0200658 A1* | 9/2006 | Penkethman | G06F 8/65 713/2 |
| 2006/0280181 A1 | 12/2006 | Brailas et al. | |
| 2007/0067364 A1 | 3/2007 | Barbian et al. | |
| 2007/0180227 A1 | 8/2007 | Akimoto | |
| 2008/0225748 A1 | 9/2008 | Khemani et al. | |
| 2008/0304518 A1 | 12/2008 | Cheng et al. | |
| 2009/0328024 A1* | 12/2009 | Li | G06F 11/1435 717/169 |
| 2010/0110935 A1* | 5/2010 | Tamassia | H04L 63/12 370/256 |
| 2010/0199259 A1 | 8/2010 | Quinn et al. | |
| 2011/0222412 A1 | 9/2011 | Kompella | |
| 2011/0252395 A1 | 10/2011 | Charisius et al. | |
| 2011/0276683 A1 | 11/2011 | Goldschlag et al. | |
| 2011/0305160 A1 | 12/2011 | Green et al. | |
| 2012/0005166 A1 | 1/2012 | Pace et al. | |
| 2012/0047276 A1 | 2/2012 | Lindquist et al. | |
| 2012/0230225 A1 | 9/2012 | Matthews et al. | |
| 2013/0339232 A1* | 12/2013 | Desai | G06Q 20/08 705/41 |
| 2014/0059527 A1 | 2/2014 | Gagliardi | |
| 2014/0059528 A1 | 2/2014 | Gagliardi | |
| 2014/0130035 A1* | 5/2014 | Desai | G06F 8/65 717/172 |
| 2014/0283040 A1 | 9/2014 | Wilkerson et al. | |
| 2014/0344315 A1* | 11/2014 | Larimore | G06F 17/30233 707/822 |
| 2015/0124840 A1 | 5/2015 | Bergeron | |
| 2015/0317171 A1* | 11/2015 | Blazek | G06F 3/0482 717/166 |
| 2016/0124829 A1 | 5/2016 | Winslow et al. | |
| 2016/0124832 A1 | 5/2016 | Kumar et al. | |

OTHER PUBLICATIONS

Merkle Hash Tree based Techniques for Data Integrity of Outsourced Data—Muhammad Saqib Niaz and Gunter Saake; Dept. of Computer Science Otto von Guericke University Magdeburg, Germany—27th Gi-Workshop on Foundations of Databases (Grundlagen von Datenbanken), May 26, 2015-May 29, 2015, Magdeburg, Germany.*

Czajkowski et al., "Jres: A Resource Accounting Interface for Java", 1998.

Dmitriev, "Profiling Java Application Using Code Hotswapping and Dynamic Call Graph Revelation", 2004.

Gregersent et al., "Javelon: An Integrated Platform for Dynamic Software Updating and its Application in Self-Systems", 2012.

* cited by examiner

AUTOMATED SOFTWARE CONFIGURATION MANAGEMENT

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

Managing configuration of software that provides a distributed business transaction can be cumbersome. When considering computer systems and software applications in a large data center, ensuring that these systems are property configured is a serious challenge. With the recent trends towards micro service architectures, the complexities of configuration have only gotten more difficult, as it becomes easier and easier to misconfigure not just an individual node, but to misconfigure the system topology.

In addition, with recent trends towards agile software development with frequent (sometimes even multiple times per day) releases of new code, ensuring that the correct version of software is deployed on the correct computer systems becomes its own configuration challenge. This can get more and more complicated as multiple independent teams in the software development organization collaborate on releasing software that may sometimes be packaged together in one large deployment binary. The challenge of ensuring that the correct version of software has been deployed can be quite difficult when considering such a scenario as most tools allow a granularity of a deployment binary, and cannot look inside.

Furthermore, in modern architectures, modern systems call out to a cloud service to discover their configuration. It therefore becomes a challenge to understand the actual running configuration as opposed to what is statically visible on the file system.

There is a need in the art for providing improved software configuration management.

SUMMARY OF THE CLAIMED INVENTION

The present technology uses agents to monitor a distributed business transaction as well as monitor changes in software configuration. An agent may detect a file load, such a class load, obtain portions of the file such as functions, and perform a hash on the byte code functions. A hash tree may then be constructed and compared to previous states of the system. The hash tree may be generated, for example, at each file loading detected, so that system states can be compared. Differences in hash trees are detected and the changes are reported to an administrator of the system that provides the distrusted business transaction.

An embodiment may include a method for managing software configurations. The method may include detecting a file load in an application by an agent installed on the application, wherein the application one of a plurality of applications that provide a distributed business transaction. The components of the file may be identified by the agent. A hash of the file components may be performed by the agent. A structured collection of the hash values may be compared to a previously constructed collection of the hash values. The results may be reported of the comparison.

An embodiment may include a system for monitoring a business transaction. The system may include a processor, memory and one or more modules stored in memory and executable by the processor. When executed, the one or more modules may detect a file load in an application by an agent installed on the application, the application one of a plurality of applications that provide a distributed business transaction, identify the components of the file by the agent, perform a hash of the file components by the agent, compare a structured collection of the hash values to a previously constructed collection of the hash values and report the results of the comparison.

DETAILED DESCRIPTION

The present technology uses agents to monitor a distributed business transaction as well as monitor changes in software configuration. An agent may detect a file load, such a class load, obtain portions of the file such as functions, and perform a hash on the byte code functions. A hash tree may then be constructed and compared to previous states of the system. The hash tree may be generated, for example, at each file loading detected, so that system states can be compared. Differences in hash trees are detected and the changes are reported to an administrator of the system that provides the distrusted business transaction.

Content is addressed by a checksum of itself, regardless of location in the filesystem hierarchy, thus allowing for an extremely efficient representation of similar content existing in different locations. The present system can model a data center configuration as such a filesystem, getting as granular as decompiled programming primitives such as classes, functions, and so on within binary code such as Java bytecode.

This approach solves two of the largest challenges in performing distributed configuration management: in a large datacenter, representing the configuration within the configuration management system can be an exercise in futility, as there is a lot of it. Having a way to store the same configuration once while understanding where it is present in a distributed manner allows the present configuration management system to use minimal storage. Furthermore, the present system can track changes over space and time in an extremely efficient way, as it can quickly tell if the same configuration on two different nodes has the same checksum, and only if not copy deltas around to the central management system. This approach allows for a highly scalable (in resources and speed) configuration management system that can track change in real time.

Additionally, this approach allows tracking change to blocks of code inside a binary program. We can easily tell if the same class binary has been deployed into an EAR file across many application servers without caring specifically if the EAR files are holistically the same. This is accomplished by looking inside the EAR files and tracking checksums of each class file independently. The system can get even get more specific by comparing methods inside the same class file, using the same checksum technique.

EAR files are a Java specific format and just one example of a service deployment artifact. References to EAR files are only used as an example herein. The techniques should be applicable to a variety of general service deployment artifacts, e.g: WAR files, python packages, .NET Web Deployment Packages, docker apps, and so forth.

Figure 1:
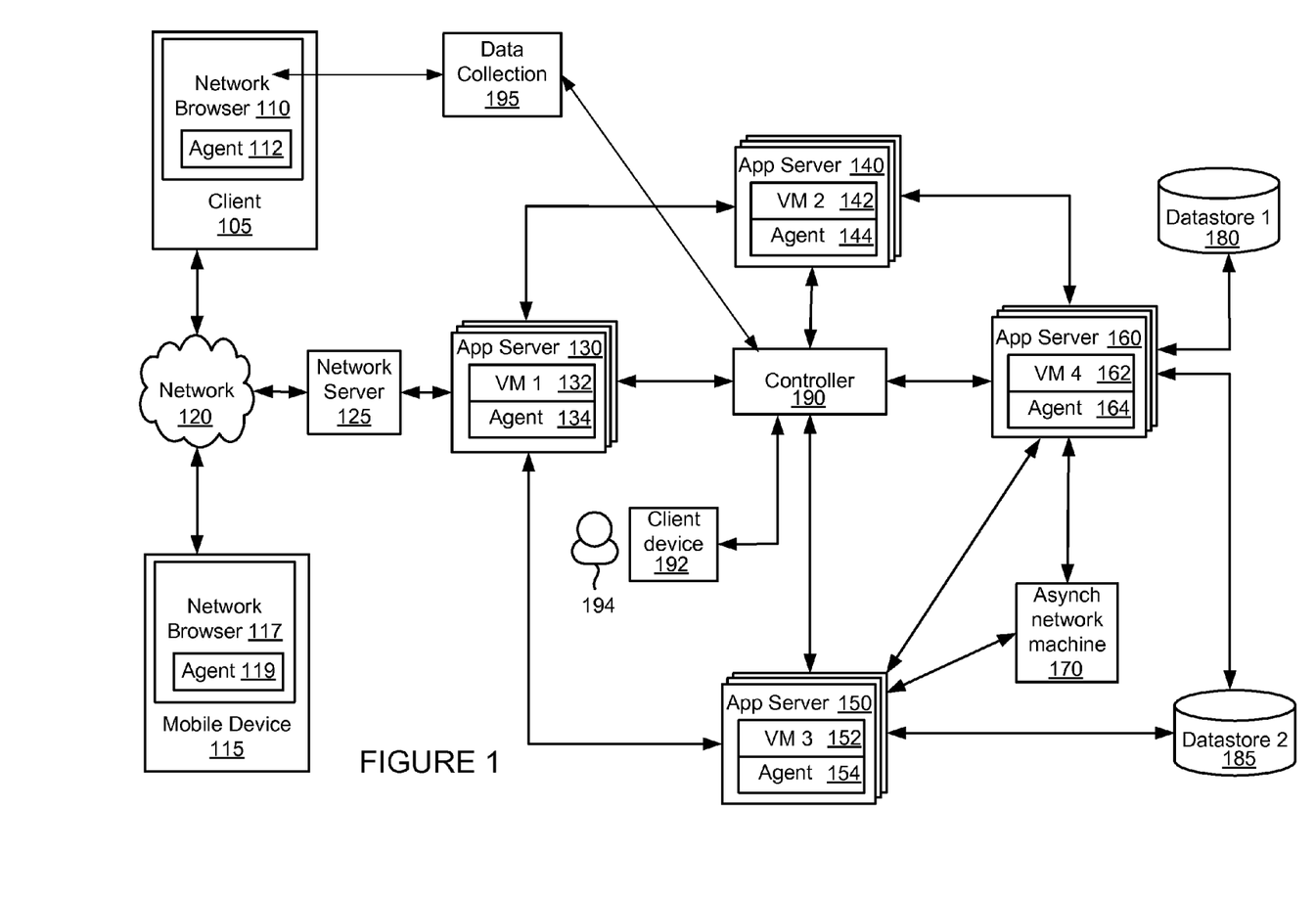
FIG. 1 is a block diagram of an exemplary system for monitoring a distributed application.

We take our solution one step further by attempting to track configuration at runtime, as opposed to merely tracking configuration as persisted on the filesystems of the computer systems that we are managing. We do this by embedding our configuration management software inside of an agent that is instrumenting the running software in process. This allows us not just to see which class files are sitting inside of an EAR file, but which class files have actually been loaded into memory and are executing. Similarly, being inside the process allows us to see the actual configuration parameters that are being used to configure the running program, including those that have dynamically been discovered, for example by calling out to a cloud service. FIG. 1 is a block diagram of a system for monitoring a distributed application. System 100 of FIG. 1 includes client device 105 and 192, mobile device 115, network 120, network server 125, application servers 130, 140, 150 and 160, asynchronous network machine 170, data stores 180 and 185, and controller 190.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120. Mobile device 115 is connected to network 120 and may be implemented as a portable device suitable for receiving content over a network, such as for example a mobile phone, smart phone, tablet computer or other portable device. Both client device 105 and mobile device 115 may include hardware and/or software configured to access a web service provided by network server 125.

Network 120 may facilitate communication of data between different servers, devices and machines. The network may be implemented as a private network, public network, intranet, the Internet, a Wi-Fi network, cellular network, or a combination of these networks.

Network server 125 is connected to network 120 and may receive and process requests received over network 120. Network server 125 may be implemented as one or more servers implementing a network service. When network 120 is the Internet, network server 125 may be implemented as a web server. Network server 125 and application server 130 may be implemented on separate or the same server or machine.

Application server 130 communicates with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1, and may implement both an application server and network server on a single machine.

Application server 130 may include applications in one or more of several platforms. For example, application server 130 may include a Java application, .NET application, PHP application, C++ application, AJAX, or other application. Different platforms are discussed below for purposes of example only.

Virtual machine 132 may be implemented by code running on one or more application servers. The code may implement computer programs, modules and data structures to implement, for example, a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132. Alternatively, other code may be byte code instrumented, such as code comprising an application which executes within virtual machine 132 or an application which may be executed on application server 130 and outside virtual machine 132.

Agent 134 on application server 130 may be installed on application server 130 by instrumentation of object code, downloading the application to the server, or in some other manner. Agent 134 may be executed to monitor application server 130, monitor virtual machine 132, and communicate with byte instrumented code on application server 130, virtual machine 132 or another application or program on application server 130. Agent 134 may detect operations such as receiving calls and sending requests by application server 130 and virtual machine 132. Agent 134 may receive data from instrumented code of the virtual machine 132, process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

Agent 134 may be a Java agent, .NET agent, PHP agent, or some other type of agent, for example based on the platform which the agent is installed on.

Each of application servers 140, 150 and 160 may include an application and an agent. Each application may run on the corresponding application server or a virtual machine. Each of virtual machines 142, 152 and 162 on application servers 140-160 may operate similarly to virtual machine 132 and host one or more applications which perform at least a portion of a distributed business transaction. Agents 144, 154 and 164 may monitor the virtual machines 142-162 or other software processing requests, collect and process data at runtime of the virtual machines, and communicate with controller 190. The virtual machines 132, 142, 152 and 162 may communicate with each other as part of performing a distributed transaction. In particular each virtual machine may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. Controller 190 may receive runtime data from each of agents 134-164, associate portions of business transaction data, communicate with agents to configure collection of runtime data, and provide performance data and reporting through an interface. The interface may be viewed as a web-based interface viewable by mobile device 115, client device 105, or some other device. In some embodiments, a client device 192 may directly communicate with controller 190 to view an interface for monitoring data.

Controller 190 may install an agent into one or more virtual machines and/or application servers 130. Controller 190 may receive correlation configuration data, such as an object, a method, or class identifier, from a user through client device 192.

Controller 190 may collect and monitor customer usage data collected by agents on customer application servers and analyze the data. The controller may report the analyzed data via one or more interfaces, including but not limited to a dashboard interface and one or more reports.

Data collection server 195 may communicate with client 105, 115 (not shown in FIG. 1), and controller 190, as well as other machines in the system of FIG. 1. Data collection server 195 may receive data associated with monitoring a client request at client 105 (or mobile device 115) and may store and aggregate the data. The stored and/or aggregated data may be provided to controller 190 for reporting to a user.

Figure 2:
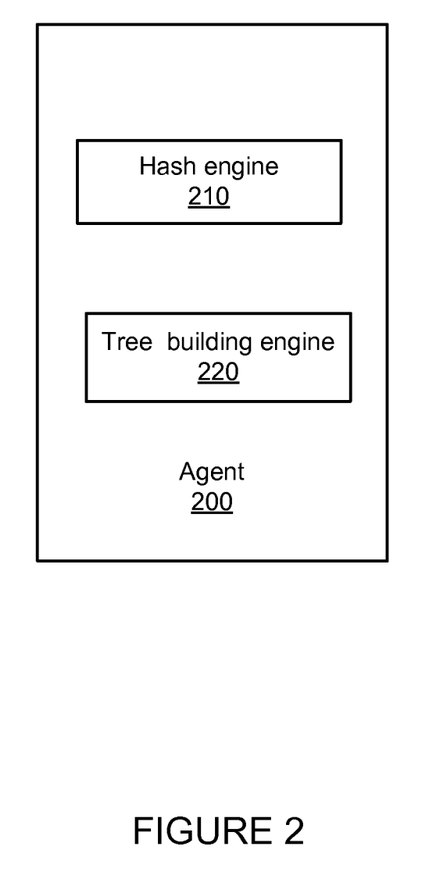
FIG. 2 is a block diagram of an agent.

FIG. 2 is a block diagram of an agent. Agent 200 may include hash engine 210 and tree building engine 220. The hash engine may perform a hash of function level elements in a software environment. The hash may be performed on byte code of the particular functions, configuration files, and other files. The hash function may be any suitable function for determining a number from the byte code.

The tree building engine 220 may be build a tree such as a Merkle tree from the hash values. The tree building engine may also compare Merkle tree of hash values generated at different times.

Figure 3:
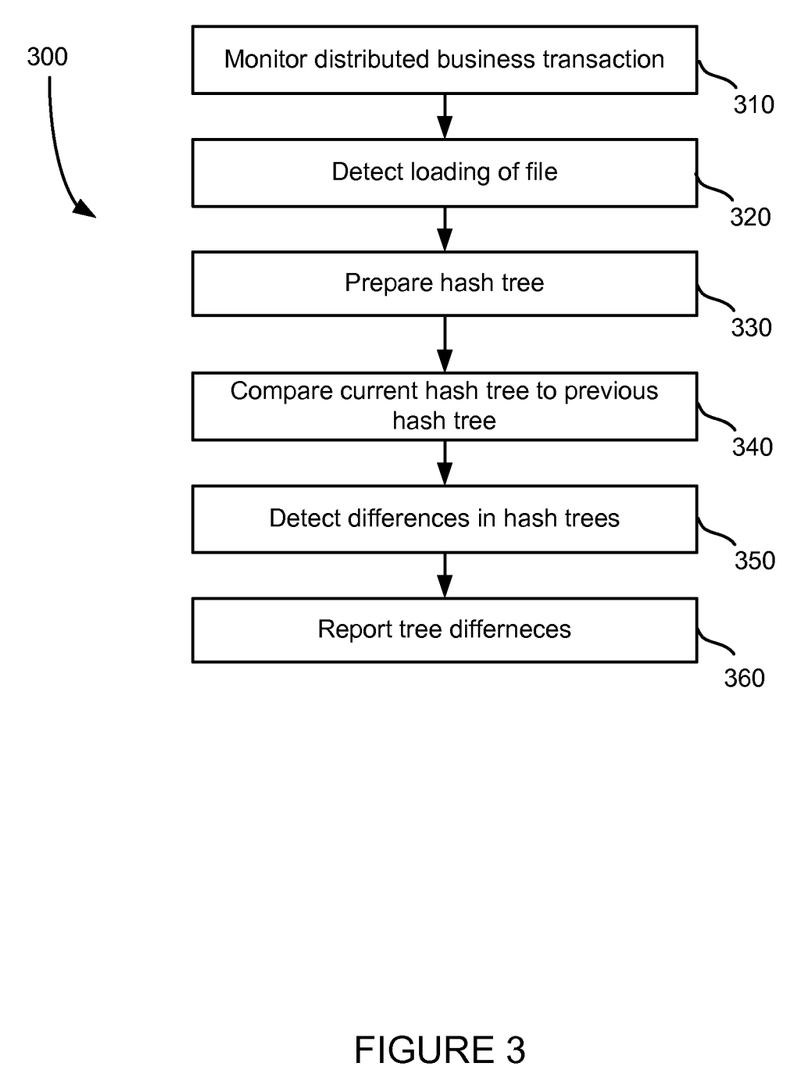
FIG. 3 is a method for determining a change in a software system.

FIG. 3 is a method for determining a change in a software system. A distributed business transaction may be monitored at step 310. The monitoring may involve agents installed on applications, virtual machines, and other components that implement a distributed business transaction, and collection of data regarding the execution of a distributed business transaction by the agents.

An agent may detect the loading of a file into the system, for example into a JVM, at step 320. The file may be a class containing functions and data, a configuration file, an XML file, or other file.

A hash tree is prepared for the loaded file at step 330. Preparing the hash tree may include identifying parts of the file, performing a hash on one or more of the parts, and building the hash tree from the hashed parts of the file. Preparing a hash tree is discussed in more detail below with respect to the method of FIG. 4.

The current hash tree (prepared at step 330) may be compared to a previous hash tree at step 340. The comparison may be preceded by a query by the agent to determine if a previous hash tree is available to compare. The comparison would then proceed if a suitable hash tree was available.

In any case, the result of the comparison may indicate a change between the hash trees, but it would not indicate exactly what the difference is because the hashes are in byte code. Hence, the difference in byte code would still be in byte code, and would not be human readable. Though the details of the difference would not be immediately recognizable, the hash and hash tree comparison could be completed very quickly in binary format.

In some instances, the comparison of hash trees is done at the controller. In this case, the agent would perform hashes, build the hash tree, and transmit the hash tree, for example a Merkle tree, to the controller. The controller may then compare the hash trees received from all agents to a previous version received from all agents.

A difference in the hash trees is determined in response to the comparison at step 350. The difference may have a granularity down to the function level for the application, JVM, or whatever is being compared. The differences may be stored and reported to an administrator at step 360.

Figure 4:
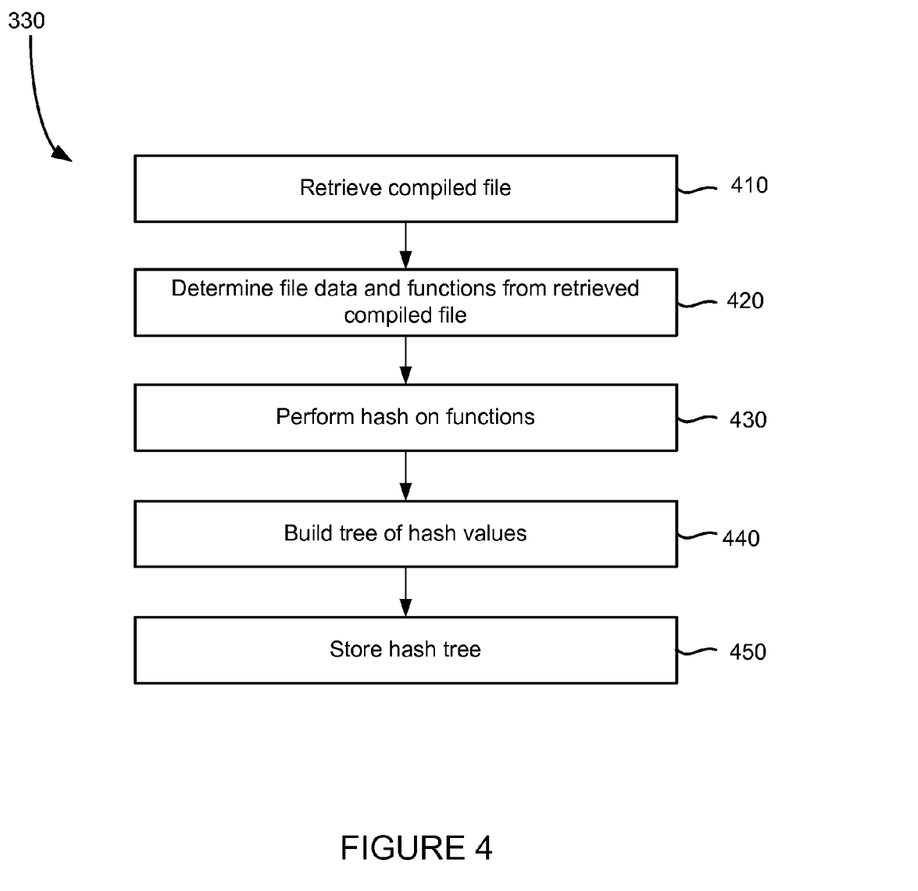
FIG. 4 is a method for preparing a hash tree.

FIG. 4 is a method for preparing a hash tree. The method of FIG. 4 provides more detail for step 330 of the method of FIG. 3. First, the compiled file, such as a class or configuration file, is retrieved at step 410. The file data and functions are determined from the retrieved compiled file at step 420. The agent may utilize an Java API to determine the functions and data that make up the loaded class to process.

Once the functions or file parts are known, a hash can be performed on the functions at step 430. The hash function may be any hash that is suitable for generating a hash value from which a hash tree, such as a Merkle tree, can be constructed.

Figure 5:
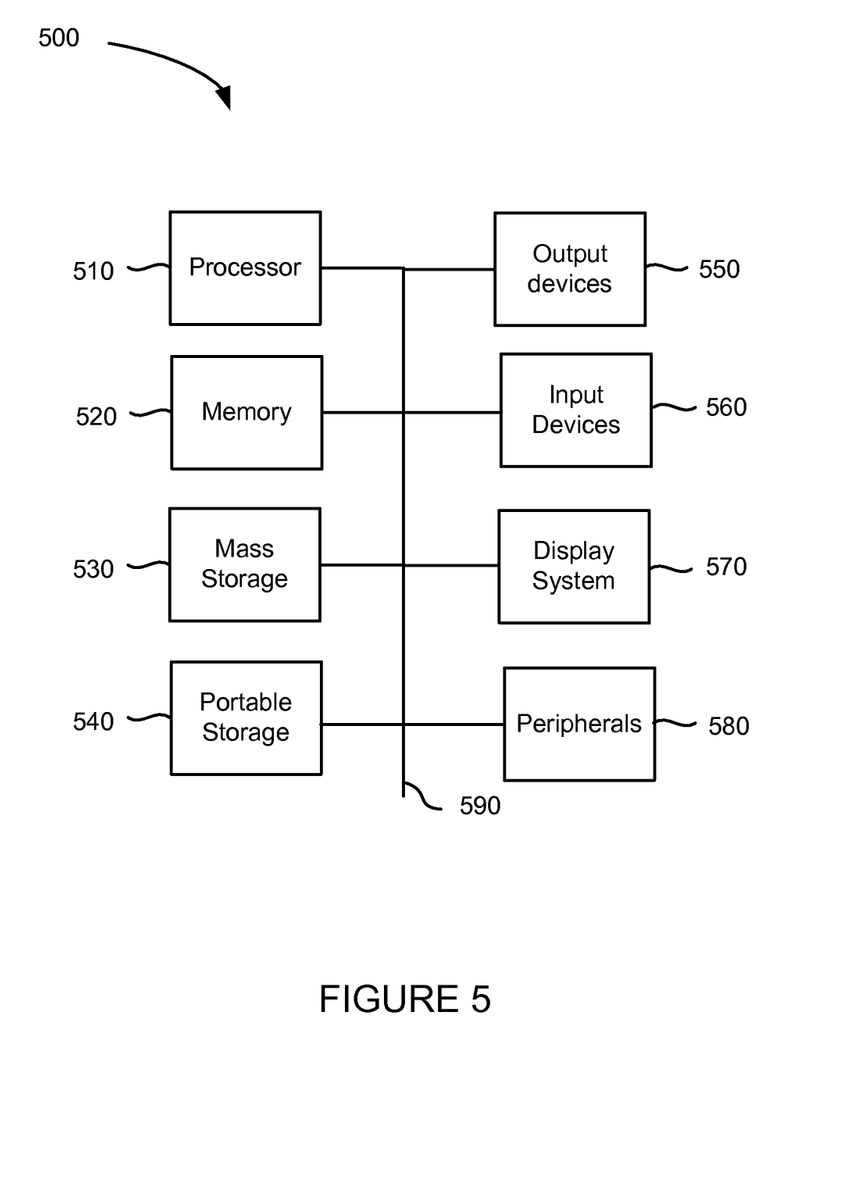
FIG. 5 is a block diagram of an exemplary system for implementing a computing device.

FIG. 5 illustrates an exemplary computing system 500 that may be used to implement a computing device for use with the present technology. System 500 of FIG. 5 may be implemented in the contexts of the likes of clients 55-115, network server 125, application servers 130-160, machine 170, data stores 180-185, and controller 190. The computing system 500 of FIG. 5 includes one or more processors 54 and memory 54. Main memory 54 stores, in part, instructions and data for execution by processor 54. Main memory 54 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 54 and main memory 54 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 54. Mass storage device 530 can store the system software for implementing embodiments of the present invention for purposes of loading that software into main memory 54.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for managing software configuration during runtime, comprising:
    detecting, by an agent installed on an application server, at runtime loading of a file in an application, the application being one of a plurality of applications that provide a distributed business transaction;
    responsive to the detecting, identifying, by the agent, components of the loaded file in byte code;
    performing, by the agent, a hash of the components of the loaded file to generate corresponding hash values;
    constructing a hash tree from the generated hash values;
    determining whether a previously constructed hash tree from a previously detected load of a file is available to perform a comparison;
    comparing the constructed hash tree against the previously constructed hash tree to identify a difference in bytecode, wherein the identified difference includes identification of a distrusted business transaction by tracking one or more changes to blocks of byte code inside the loaded file; and
    reporting results of the comparison.

2. The method of claim 1, wherein the components include functions and data, and wherein the hash is performed on the functions.

3. The method of claim 1, wherein the components include portions of a configuration file.

4. The method of claim 1, wherein constructing the hash tree includes constructing a Merkle tree from the hash values.

5. The method of claim 1, including constructing the hash tree responsive to detection of each loading of a file.

6. A non-transitory computer-readable storage medium having embodied thereon a program, the program being executable by a processor to perform operations for managing software configuration, the operations including:
    detecting, by an agent installed on an application server, at runtime loading of a file in an application, the application being one of a plurality of applications that provide a distributed business transaction;
    responsive to the detecting, identifying, by the agent, components of the loaded file in byte code;
    performing, by the agent, a hash of the components of the loaded file to generate corresponding hash values;
    constructing a hash tree from the generated hash values;
    determining whether a previously constructed hash tree from a previously detected load of a file is available to perform a comparison;
    comparing the constructed hash tree against the previously constructed hash tree to identify a difference in bytecode, wherein the identified difference includes identification of a distrusted business transaction by tracking one or more changes to blocks of byte code inside the loaded file; and
    reporting results of the comparison.

7. The non-transitory computer-readable storage medium of claim 6, wherein the components include functions and data, and wherein the hash is performed on the functions.

8. The non-transitory computer-readable storage medium of claim 6, wherein the components include portions of a configuration file.

9. The non-transitory computer-readable storage medium of claim 6, including constructing a hash tree responsive to detection of each loading of a file.

10. A system for managing software configuration for delivering an agent on a machine, the system comprising:
    a processor; memory; and
    one or more modules stored in memory and executable by the processor to perform operations including:
        detect at runtime loading of a file in an application, the application being one of a plurality of applications that provide a distributed business transaction;
        responsive to the detecting, identifying components of the loaded file in byte code;
        perform a hash of the components of the loaded file to generate corresponding hash values;
        construct a hash tree from the generated hash values;
        determine whether a previously constructed hash tree from a previously detected load of a file is available to perform a comparison;
        compare the constructed hash tree against the previously constructed hash tree to identify a difference in bytecode, wherein the identified difference includes identification of a distrusted business transaction by tracking one or more changes to blocks of byte code inside the loaded file; and
report results of the comparison.

11. The system of claim 10, wherein the components include functions and data, and wherein the hash is performed on the functions.

12. The system of claim 10, wherein the components include portions of a configuration file.

13. The system of claim 10, including constructing a hash tree responsive to detection of each loading of a file.

* * * * *